(12) United States Patent
Miller et al.

(10) Patent No.: US 10,791,615 B2
(45) Date of Patent: Sep. 29, 2020

(54) APPARATUS FOR GENERATING X-RAYS

(71) Applicant: KONINKLIJKE PHILIPS N.V., Eindhoven (NL)

(72) Inventors: Lester Donald Miller, Hudson, OH (US); Nirmal Soni, Highland Heights, OH (US); Rolf Karl Otto Behling, Norderstedt (DE); Roland Proksa, Neu Wulmstorf (DE); Dionys Van De Ven, Hamburg (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 20 days.

(21) Appl. No.: 16/086,440

(22) PCT Filed: Mar. 21, 2017

(86) PCT No.: PCT/EP2017/056601
§ 371 (c)(1),
(2) Date: Sep. 19, 2018

(87) PCT Pub. No.: WO2017/162613
PCT Pub. Date: Sep. 28, 2017

(65) Prior Publication Data
US 2019/0116654 A1    Apr. 18, 2019

Related U.S. Application Data

(60) Provisional application No. 62/312,536, filed on Mar. 24, 2016.

(30) Foreign Application Priority Data

Apr. 12, 2016 (EP) .................................. 16164925

(51) Int. Cl.
*H05G 1/32*    (2006.01)
*H05G 1/58*    (2006.01)
(Continued)

(52) U.S. Cl.
CPC ............. *H05G 1/32* (2013.01); *G01V 5/0041* (2013.01); *H01J 35/045* (2013.01); *H01J 35/06* (2013.01);
(Continued)

(58) Field of Classification Search
CPC .. H05G 1/31; H05G 1/10; H05G 1/58; G01V 5/0041; H01J 35/045; H01J 35/101; H01J 35/06; H01J 2235/068
See application file for complete search history.

(56) References Cited

U.S. PATENT DOCUMENTS 5,661,774 A    8/1997 Gordon
7,209,537 B2    4/2007 Popescu
(Continued)

FOREIGN PATENT DOCUMENTS

DE    102009035439 A1    8/2010
KR    20140028306 A    3/2014

OTHER PUBLICATIONS

Primak, A.N., et al., "Improved Dual-Energy Material Discrimination for Dual-Source CT by Means of Additional Spectral Filtration", Department of Radiology, Med Phys. Apr. 2009; 36(4).

*Primary Examiner* — Kiho Kim
(74) *Attorney, Agent, or Firm* — Larry Liberschuk (57) ABSTRACT

The present invention relates to an apparatus for generating X-rays. It is described to produce (210) with a power supply (40) at least two voltages between at least one cathode (20) and an anode (30), wherein the at least two voltages comprises a first voltage and a second voltage. The at least one cathode is positioned relative to the anode. Electrons are emitted (220) from the at least one cathode. Electrons emitted from the at least one cathode are interacted (230) with the anode with energies corresponding to the at least two voltages. X-rays are generated (230) from the anode, wherein the electrons interact with the anode to generate the
(Continued)

X-rays. First X-rays are generated when the power supply produces the first voltage and second X-rays are generated when the power supply produces the second voltage. The power supply is controlled (250), such that a ratio between the first X-rays and the second X-rays is controllable.

12 Claims, 9 Drawing Sheets

(51) Int. Cl.
*H01J 35/06* (2006.01)
*H01J 35/10* (2006.01)
*H01J 35/04* (2006.01)
*G01V 5/00* (2006.01)
*H05G 1/10* (2006.01)

(52) U.S. Cl.
CPC .............. *H01J 35/101* (2013.01); *H05G 1/10* (2013.01); *H05G 1/58* (2013.01); *H01J 2235/068* (2013.01)

(56) References Cited

U.S. PATENT DOCUMENTS

| | | | |
|---|---|---|---|
| 7,397,898 B2 * | 7/2008 | Holland | H01J 35/10 |
| | | | 378/136 |
| 7,668,296 B2 * | 2/2010 | Schaefer | H01J 35/06 |
| | | | 378/136 |
| 7,792,241 B2 | 9/2010 | Inu | |
| 7,826,587 B1 | 11/2010 | Langan | |
| 2004/0247082 A1 | 12/2004 | Hoffman | |
| 2005/0078794 A1 | 4/2005 | Leek | |
| 2009/0060141 A1 * | 3/2009 | Fritzler | H01J 35/065 |
| | | | 378/134 |
| 2010/0104062 A1 | 4/2010 | Wu | |
| 2010/0166141 A1 * | 7/2010 | Vermilyea | H01J 35/10 |
| | | | 378/19 |
| 2013/0083899 A1 * | 4/2013 | Greenland | H01J 35/06 |
| | | | 378/134 |
| 2013/0294578 A1 | 11/2013 | Hanlon | |
| 2014/0177808 A1 | 6/2014 | Charlette | |

* cited by examiner

APPARATUS FOR GENERATING X-RAYS

FIELD OF THE INVENTION

The present invention relates to an apparatus for generating X-rays, to a system for generating X-rays, and to a method for generating X-rays, as well as to a computer program element and a computer readable medium.

BACKGROUND OF THE INVENTION

The general background of this invention is the field of X-ray tube technology and in particular X-ray tube technology for computed X-ray tomography. An X-ray tube (or source) can be operated at different tube voltages to generate different source spectra. Source spectra can also be shaped by positioning different materials in the X-ray beam. Spectral information can be obtained from a source-detector system using the following methods: Slow kV Switching; Rapid kV Switching; Dual X-ray Tube; Split Beam Filtering; Dual Layer Detection; Photon Counting. Source spectra are basically determined by the tube voltage, the target material and the filtration between the beam and the patient. The methods used today to shape the spectral beam quality are typically very discrete and very inflexible. For example, filtering the X-ray beam can only increase the average effective photon energy thus hardening the beam, and lowering the average photon energy in an x-ray source through the use of a lower tube voltage leads to a reduction in the production of higher energy photons.

US 2013/0294578A1 describes techniques and systems for varying a voltage applied to a radiation source of an imaging modality to vary an energy of emitted radiation.

SUMMARY OF THE INVENTION

It would be advantageous to have improved apparatus for generating X-rays. The object of the present invention is solved with the subject matter of the independent claims, wherein further embodiments are incorporated in the dependent claims. It should be noted that the following described aspects and examples of the invention apply also for the apparatus for generating X-rays, System for generating X-rays, the method for generating X-rays, and for the computer program element and the computer readable medium.

According to a first aspect, there is provided an apparatus for generating X-rays, comprising:

at least one cathode;
an anode;
a power supply;
a processing unit.

The power supply is configured to produce at least two voltages between the at least one cathode and the anode, wherein the at least two voltages comprises a first voltage and a second voltage. The at least one cathode and anode are operable such that electrons emitted from the at least one cathode interact with the anode with energies corresponding to the at least two voltages, and wherein the electrons interact with the anode to generate X-rays. The at least one cathode and anode are operable such that first X-rays are generated when the power supply produces the first voltage and second X-rays are generated when the power supply produces the second voltage. The processing unit is configured to control the power supply, such that a ratio between the first X-rays and the second X-rays is controllable.

In this way shaping of an X-ray spectrum is provided with superposition of multiple energies combined for a single source. To put this another way, extra degrees of freedom are utilised to enhance spectral shaping. The source spectrum is enabled to be shaped, and this facilitates spectra to be optimized depending upon the source-patient-detector system.

In other words, a combination (e.g. linear) of different voltages (where those different voltage can be applied to one or more than one source) enables different spectrums to be produced from each source that can be tailored and optimised to the patient, contrast agents, detectors and the spectral study being performed. Line integrals used to reconstruct a voxel in the image can be associated with X-ray radiation derived from a combination of source voltage energies, and where the relative amount of X-rays coming from the different voltage sources can be tailored for the specific use. Furthermore, high energy photons are maintained while at the same time, increased amounts of low energy photons can be added.

A flexible way of producing a mix of high and low energy photons is provided, where the overall spectral shape can be optimised for a particular patient or for a particular spectral study.

By enabling the ratio between the first and second X-rays to be controlled, a maximum separation between the average energies of the first and second X-rays can be provided. Furthermore, consistency of operation is provided, where for example deterioration in operation associated with the generation of the first (or second or indeed both first and second) X-rays leading to a change in X-ray output can be mitigated through controlling the ratio of first to second X-rays such that the output remains substantially unaltered.

In this manner an apparatus generates X-rays that enables acquired image quality to be improved, through improvement of contrast resolution (for example in a conventional computer tomography CT system) and improvement of spectral performance in a spectral system.

According to the first aspect, the at least one cathode comprises a first cathode and a second cathode. The power supply is configured to produce the first voltage between the first cathode and the anode and the power supply is configured to produce the second voltage between the second cathode and the anode.

In this manner, great flexibility is provided where for example both cathodes can be operated in a DC manner enabling X-rays to be generated from an anode with X-ray energies characteristic of the voltages between the cathodes and the anode, and where the amount of the X-rays generated due to operation of one cathode can be varied with respect to the amount of X-rays generated due to operation of the other cathode in order to spectrally shape the resultant spectrum as required. Enabling one or both of the two cathodes to also operated between two voltages provides for the ability to more flexibly tailor the resultant spectrum.

In an example, the power supply is configured to supply a first current to the first cathode and to supply a second current to the second cathode. The processing unit is configured to control the first current and the second current to control the ratio between the first X-rays and the second X-rays.

In other words, for the at least one cathode operating at the first and second voltages (which can be one cathode alternating between those voltages or two cathodes operating in a DC manner one at one voltage and one at the other voltage, or indeed two cathodes with one or both operating in a pulsed manner between the two voltages) the current can be controlled such that the emitted electron power is controlled leading to control of the associated X-ray emission, with this enabling the relative amounts of X-rays corresponding to operation of the first and second cathodes to be varied and in this way the X-ray spectrum can be tailored.

In an example, the apparatus is configured to determine an energy of the first X-rays and determine an energy of the second X-rays, and wherein the ratio between the first X-rays and second X-rays comprises a ratio between the energy of the first X-rays and the energy of the second X-rays.

In this manner, a convenient means, based on an easily determinable quantity, is provided by which spectral shaping can be carried out as necessary.

In an example, the energy of the first X-rays comprises an integrated X-ray energy and the energy of the second X-rays comprises an integrated X-ray energy.

In an example, the power supply is configured to vary the at least two voltages between the first voltage and the second voltage with a duty cycle, and wherein the processing unit is configured to control the duty cycle to control the ratio between the first X-rays and the second X-rays.

In other words, the at least one cathode is held at the first voltage for a time T1 and then is held at the second voltage for a time T2, and then returns to the first voltage for a time T1 with this repeating, where a time T=T1+T2. The durations T, T1, and T2 then all form part of the definition of the duty cycle. Thus, T is able to be varied, and T1 can be varied with respect to T2 to vary the duty cycle. In an example T1 is varied whilst T2 is constant to vary the duty cycle. In an example T2 is varied whilst T1 is constant to vary the duty cycle. In an example both T1 and T2 are varied to vary the duty cycle, where the ratio of T1 to T2 is also varied; i.e., T is also varied.

In this manner, one cathode can be operated at two voltages, each associated with production of an X-ray spectrum, and a combined X-ray spectrum can be tailored by changing how long the cathode is held at one voltage (with respect to the anode) relative to how long it is held at the other voltage, and in this way the relative amounts of the spectrums can be altered relatively enabling the spectral shape to be tailored as necessary.

In an example, the at least one cathode comprises at least one grid switched cathode head.

In this way, independent control of cathode current (e.g. tube current) is facilitated.

In this manner, control of electron emission and hence of X-ray generation is improved, enabling improved tailoring and control of the spectral shape.

In an example, the at least one grid switched cathode head is synchronized with the duty cycle.

In an example, the power supply is configured to supply at least two currents to the at least one cathode, and wherein the processing unit is configured to control the at least two currents to control the ratio between the first X-rays and the second X-rays.

In an example, the power supply is configured such that the anode is operable to generate the first X-rays and the second X-rays at substantially the same time.

In an example, the anode comprises a rotating body, and wherein the power supply is configured to be synchronized with a rotational frequency of the anode.

In other words, the electrons emitted from the at least one cathode can be synchronized with a rotation of the anode. For example, the anode can be formed like a pie, with different segments being made of different materials. The electrons emitted from one cathode, having an energy characterized by the voltage between the cathode and anode (e.g. 140 kV) can be synchronized through control of the power supply with respect to the rotation frequency to only interact with one material. Similarly, electrons emitted from a second cathode, having an energy characterized by the voltage between the cathode and anode (e.g. 60 kV) can be synchronized through control of the power supply with respect to the rotation frequency to only interact with a different material of the anode. Furthermore, electrons at 140 kV could be synchronized to interact with materials A and B, and electrons at 60 kV to interact with materials C and D, for example. Therefore, another degree of freedom is provided for shaping the spectrum.

According to a second aspect, there is provided a system for imaging an object, comprising:
  an apparatus for generating X-rays as previously described;
  an X-ray detector;
  an output unit.

The at least one cathode and the at least one anode are configured to be positioned relative to the X-ray detector such that at least a part of the region between them is an examination region for accommodating an object. The X-ray detector is configured to acquire image data of the object. The output unit is configured to output data representative of the image data of the object.

In this way, the at least one cathode and the at least one anode are positioned such that between the cathode(s)/anode and the X-ray detector there is provided an examination region for accommodating an object.

According to a third aspect, there is provided a method for generating X-rays, comprising:
a) producing with a power supply at least two voltages between at least one cathode and an anode, wherein the at least two voltages comprises a first voltage and a second voltage;
b) emitting electrons from the at least one cathode;
c) interacting electrons emitted from the at least one cathode with the anode with energies corresponding to the at least two voltages;
d) generating X-rays from the anode, wherein the electrons interact with the anode to generate the X-rays, wherein first X-rays are generated when the power supply produces the first voltage and second X-rays are generated when the power supply produces the second voltage;
e) controlling the power supply, such that a ratio between the first X-rays and the second X-rays is controllable.

According to the third aspect, the at least one cathode comprises a first cathode and a second cathode, wherein the method comprises producing with the power supply the first voltage between the first cathode and the anode and producing with the power supply the second voltage between the second cathode and the anode.

According to another aspect, there is provided a computer program element controlling apparatus as previously described which, in the computer program element is executed by processing unit, is adapted to perform the method steps as previously described.

According to another aspect, there is provided a computer readable medium having stored computer element as previously described.

Advantageously, the benefits provided by any of the above aspects equally apply to all of the other aspects and vice versa.

The above aspects and examples will become apparent from and be elucidated with reference to the embodiments described hereinafter.

BRIEF DESCRIPTION OF THE DRAWINGS

Exemplary embodiments will be described in the following with reference to the following drawings.

DETAILED DESCRIPTION OF EMBODIMENTS

Figure 1:
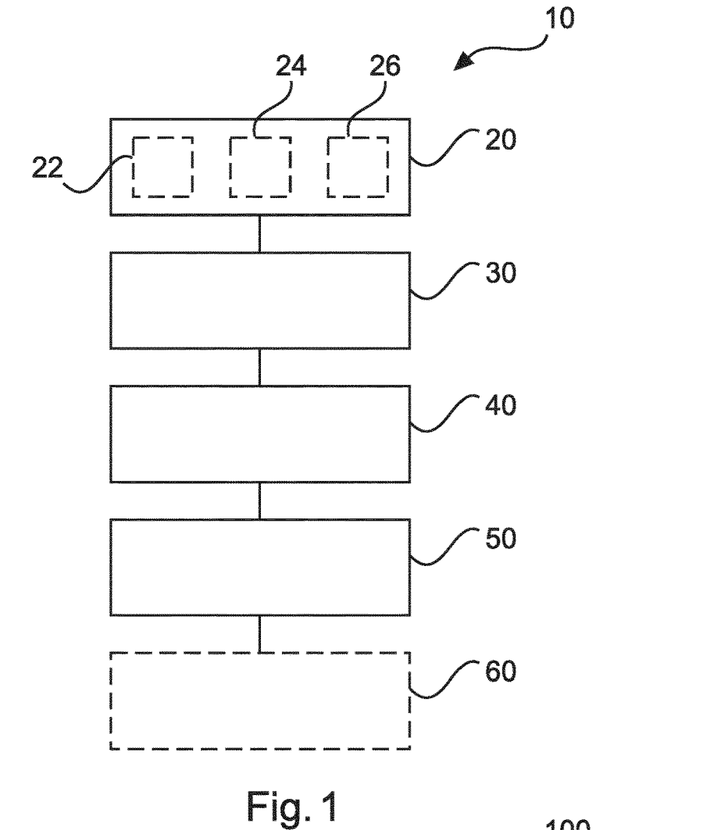
FIG. 1 shows a schematic set up of an example of an apparatus for generating X-rays.

FIG. 1 shows an example of an apparatus 10 for generating X-rays. The apparatus 10 comprises at least one cathode 20, an anode 30, a power supply 40, and a processing unit 50. The power supply 40 is configured to produce at least two voltages between the at least one cathode 20 and the anode 30, wherein the at least two voltages comprises a first voltage and a second voltage. The at least one cathode 20 is positioned relative to the anode 30. The at least one cathode 20 and anode 30 are operable such that electrons emitted from the at least one cathode 20 interact with the anode 30 with energies corresponding to the at least two voltages, and wherein the electrons interact with the anode 30 to generate X-rays. The at least one cathode 30 and anode 30 are operable such that first X-rays are generated when the power supply 40 produces the first voltage and second X-rays are generated when the power supply 40 produces the second voltage. The processing unit 50 is configured to control the power supply 40, such that a ratio between the first X-rays and the second X-rays is controllable.

According to an example, the at least one cathode comprises a first cathode 22 and a second cathode 24. The power supply 40 is configured to produce the first voltage between the first cathode 22 and the anode 30 and the power supply 40 is configured to produce the second voltage between the second cathode 24 and the anode 30.

In an example, two or more adjacent cathode structures are provided biased at different voltages.

In an example, a shoot through cathode structure is provided where two or more cathodes are biased at different voltages. In this manner, a very compact cathode is provided, where only one focusing and deflection unit is needed to operate with the cathode structure, with space and cost savings also being provided.

In an example, the power supply is configured to produce the first voltage between the first cathode and the anode and produce the second voltage between the first cathode and the anode. In this manner, the first cathode can be operated in a pulsed manner, wherein the cathode pulses from the first voltage to the second voltage and back to the first voltage in a repeating manner. In an example, the power supply is configured to produce the second voltage between the second cathode and the anode and produce the first voltage between the second cathode and the anode. In this manner, the second cathode can be operated in a pulsed manner, wherein the cathode pulses from the second voltage to the first voltage and back to the second voltage in a repeating manner.

In an example, the first cathode is operated in a DC mode. In an example, the second cathode is operated in a DC mode. In an example, the first cathode is operated in a pulsed mode. In an example, the second cathode is operated in a pulsed mode. In an example, the first cathode is operated in a DC mode and the second cathode is operated in a DC mode. In an example, the first cathode is operated in a pulsed mode and the second cathode is operated in a pulsed mode. In an example, the first cathode is operated in a DC mode and the second cathode is operated in a pulsed mode. In an example, the first cathode is operated in a pulsed mode and the second cathode is operated in a DC mode.

According to an example, the power supply 40 is configured to supply a first current to the first cathode 22 and to supply a second current to the second cathode 24. The processing unit 50 is configured to control the first current and the second current to control the ratio between the first X-rays and the second X-rays.

In an example, the power supply is configured to supply the second current to the first cathode and to supply the first current to the second cathode.

According to an example, the apparatus 10 is configured to determine an energy of the first X-rays and determine an energy of the second X-rays, and wherein the ratio between the first X-rays and second X-rays comprises a ratio between the energy of the first X-rays and the energy of the second X-rays.

In an example, an X-ray monitor 60 is used to determine the energy. In an example, a look up table of operational characteristics comprising cathode to anode voltage and cathode current is used to determine the energy.

According to an example, the energy of the first X-rays comprises an integrated X-ray energy and the energy of the second X-rays comprises an integrated X-ray energy.

In an example, the processing unit controls the power supply such that the integrated energy for the first X-rays equals the integrated energy of the second X-rays.

According to an example, the power supply 40 is configured to vary the at least two voltages between the first voltage and the second voltage with a duty cycle. The processing unit 50 is configured to control the duty cycle to control the ratio between the first X-rays and the second X-rays.

In an example, operating with a duty cycle comprises utilizing a natural ripple from a power supply having a reduced capacitance.

In an example, the duty cycle is not synchronized to a detection period (e.g. a sampling period).

In an example, the duty cycle can be synchronized with an anode rotational frequency. In this manner, the effects of anode slots or other anode imperfections can be minimized. Also, in this manner different filtration can be built into the anode, and operation of the at least one anode at different voltages can be synchronized to the different filtrations built into a rotating anode.

According to an example, the at least one cathode 20 comprises at least one grid switched cathode head 26.

In an example, the first cathode and/or the second cathode comprises a grid switched cathode head. In an example, a single cathode is used with voltages applied having a duty cycle, and a single grid switched cathode head is provided.

In an example, the at least one grid switched cathode head is synchronized with a detector detection period.

According to an example, the at least one grid switched cathode head 26 is synchronized with the duty cycle.

According to an example, the power supply 40 is configured to supply at least two currents to the at least one cathode 20, and wherein the processing unit 50 is configured to control the at least two currents to control the ratio between the first X-rays and the second X-rays.

In an example when applying a duty cycle to a single cathode (operating between the first and second voltages) the power can be held substantially constant as the voltage varies.

In an example, the power when operating at one voltage can be different to the power when operating at the other voltage.

According to an example, the power supply 40 is configured such that the anode 30 is operable to generate the first X-rays and the second X-rays at substantially the same time.

In an example, the power supply 40 is configured such that the first cathode 22 and second cathode 24 are operable to emit electrons at substantially the same time.

According to an example, the anode comprises a rotating body, and wherein the power supply is configured to be synchronized with a rotational frequency of the anode.

Figure 2:
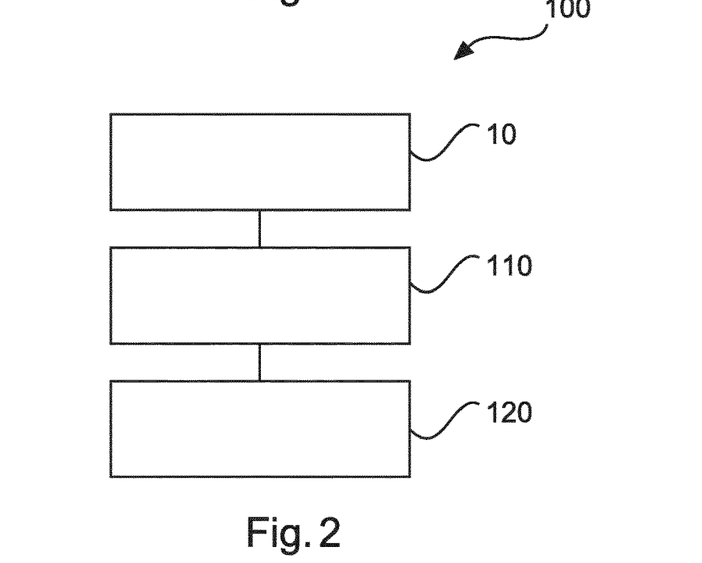
FIG. 2 shows a schematic set up of an example of a system for generating X-rays.

FIG. 2 shows an example of a system 100 for generating X-rays. The system 100 comprises an apparatus 10 for generating X-rays as described above with respect to any one or more of the examples described with FIG. 1. The system 100 also comprises an X-ray detector 110, and an output unit 120. The at least one cathode 20 and the at least one anode 30 are configured to be positioned relative to the X-ray detector 110 such that at least a part of the region between them is an examination region for accommodating an object. The X-ray detector 110 is configured to acquire image data of the object. The output unit 120 is configured to output data representative of the image data of the object.

Figure 3:
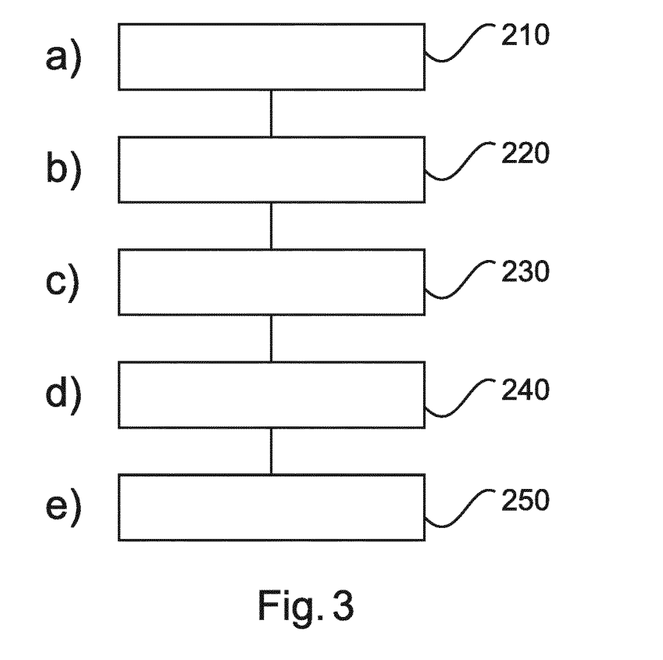
FIG. 3 shows a method for generating X-rays.

FIG. 3 shows a method 200 for generating X-rays in its basic steps. The method comprises:

in a producing step 210, also referred to as step a), at least two voltages are produced with a power supply 40 between at least one cathode 20 and an anode 30, wherein the at least two voltages comprises a first voltage and a second voltage, wherein the at least one cathode is positioned relative to the anode;

in an emitting step 220, also referred to as step b), electrons are emitted from the at least one cathode;

in an interacting step 230, also referred to as step c), the electrons emitted from the at least one cathode are interacted with the anode with energies corresponding to the at least two voltages;

in a generating step 240, also referred to as step d), X-rays are generated from the anode, wherein the electrons interact with the anode to generate the X-rays, wherein first X-rays are generated when the power supply produces the first voltage and second X-rays are generated when the power supply produces the second voltage;

in a controlling step 250, also referred to as step e), the power supply is controlled, such that a ratio between the first X-rays and the second X-rays is controllable.

In an example, the at least one cathode comprises a first cathode and a second cathode, wherein the method comprises producing with the power supply the first voltage between the first cathode and the anode and producing with the power supply the second voltage between the second cathode and the anode.

In an example, method comprises supplying with the power supply a first current to the first cathode and supplying with the power supply a second current to the second cathode, and wherein the method comprises controlling the first current and the second current to control the ratio between the first X-rays and the second X-rays.

In an example, the method comprises determining an energy of the first X-rays and determining an energy of the second X-rays, and wherein the ratio between the first X-rays and second X-rays comprises a ratio between the energy of the first X-rays and the energy of the second X-rays.

In an example, the energy of the first X-rays comprises an integrated X-ray energy and the energy of the second X-rays comprises an integrated X-ray energy.

In an example, the method comprises varying with the power supply the at least two voltages between the first voltage and the second voltage with a duty cycle, and the method comprises controlling the duty cycle to control the ratio between the first X-rays and the second X-rays.

In an example, the method comprises supplying with the power at least two currents to the at least one cathode, and wherein the method comprises controlling the at least two currents to control the ratio between the first X-rays and the second X-rays.

In an example, the at least one cathode comprises at least one grid switched cathode head.

In an example, the method comprises synchronizing the at least one grid switched cathode head with the duty cycle and/or a detector detection period.

In an example, the method comprises configuring the power supply such that the anode is operable to generate the first X-rays and the second X-rays at substantially the same time.

In an example, the method comprises configuring the power supply such that the first cathode and second cathode are operable to emit electrons at substantially the same time.

In an example, the anode comprises a rotating body, and the method comprising synchronizing the power supply with a rotational frequency of the anode.

Examples of the apparatus, system and method for generating X-rays will now be described in more detail in conjunction with FIGS. 4-17.

Figure 4:
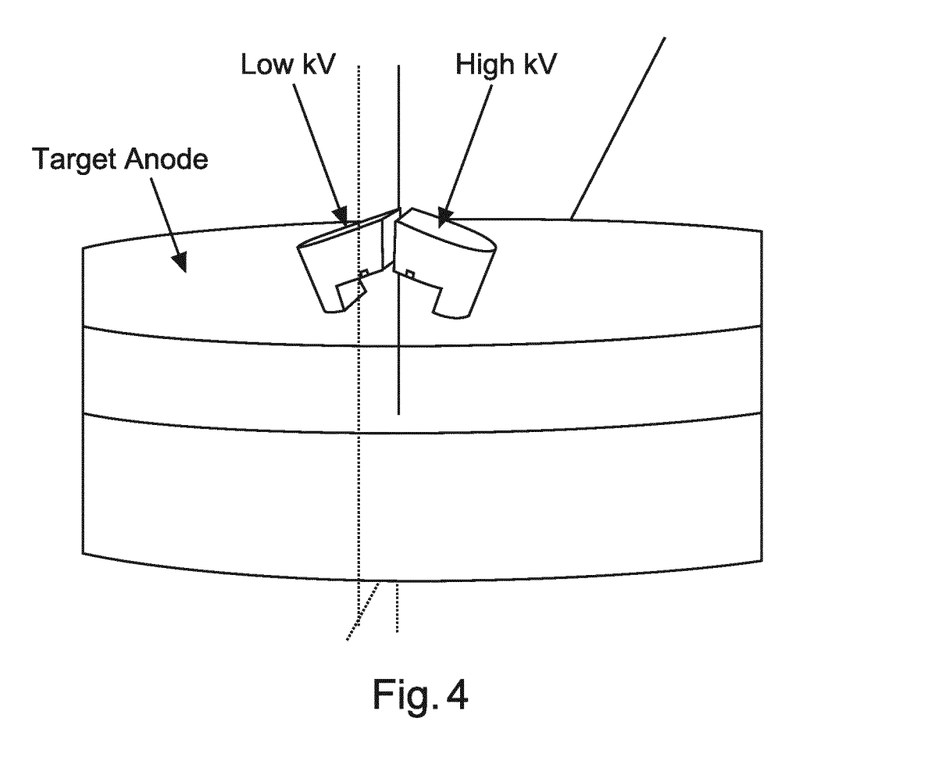
FIG. 4 shows a schematic example of an apparatus for generating X-rays.
Figure 5:
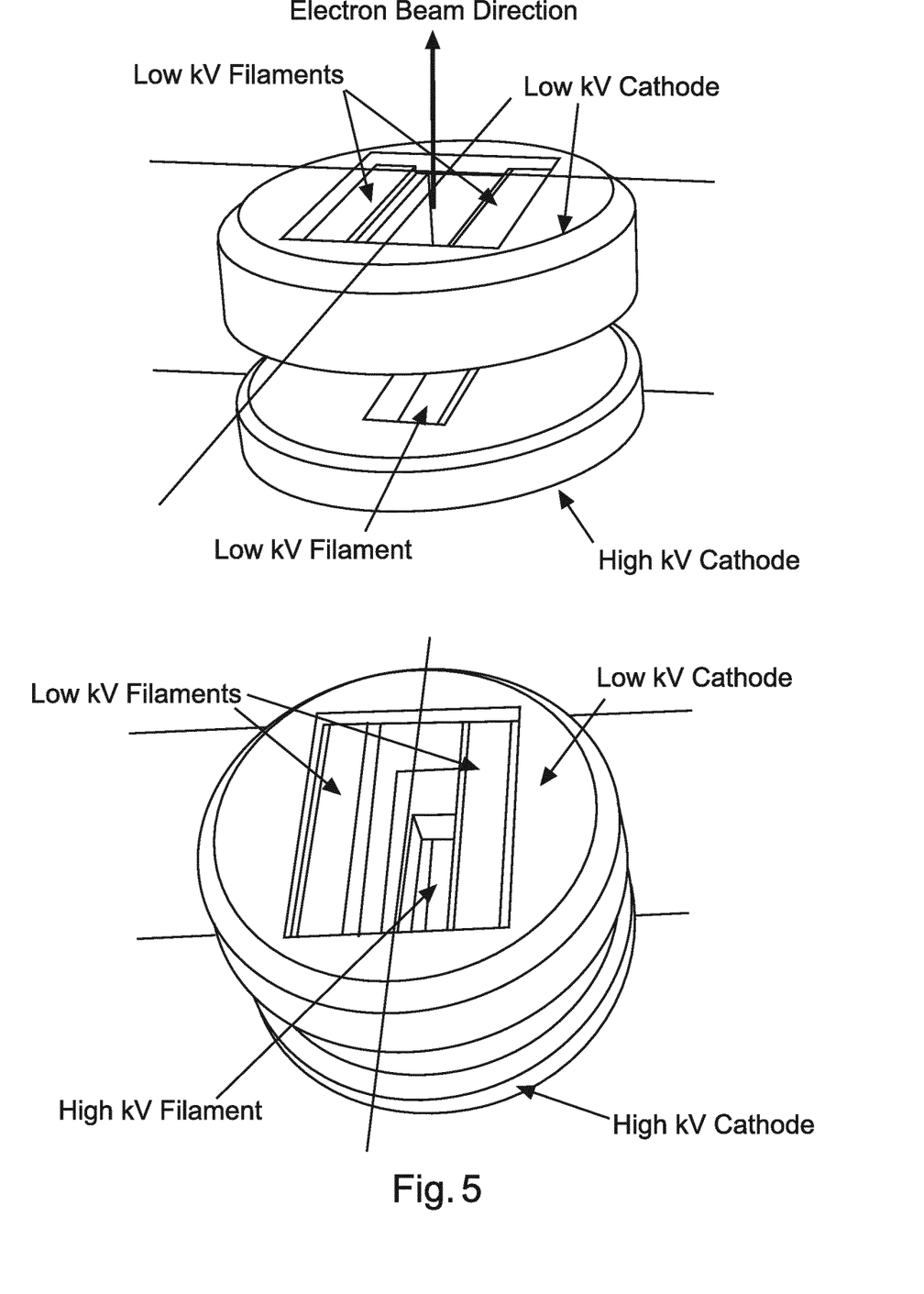
FIG. 5 shows a schematic example of a multiple cathode for use with an example of an apparatus for generating X-rays.
Figure 6:
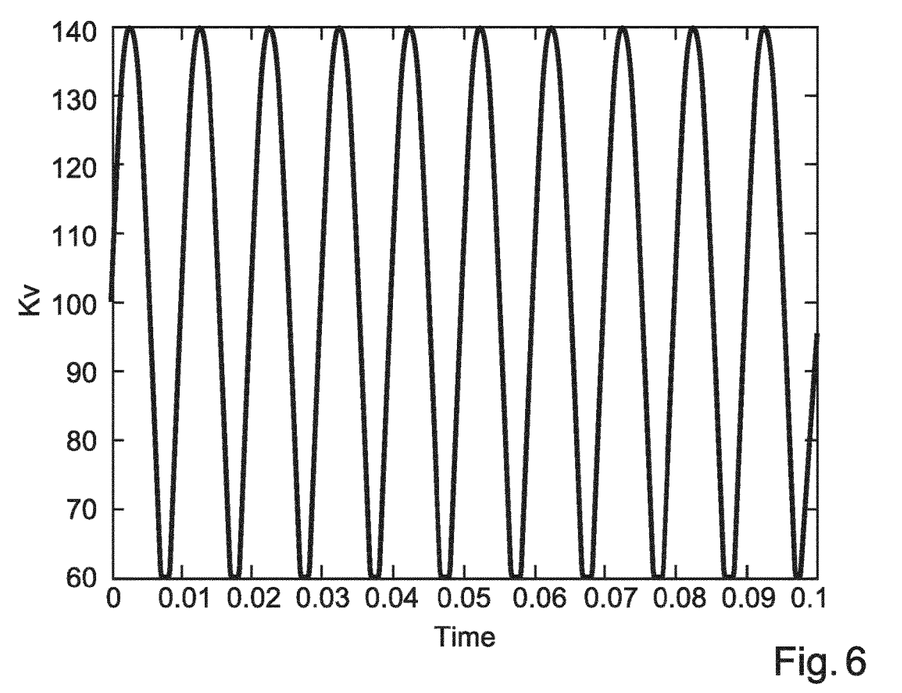
FIG. 6 shows a high voltage ripple sinewave.

FIG. 4 shows an exemplar apparatus for generating X-rays, and FIG. 5 shows an exemplar multiple cathode for use with an exemplar apparatus for generating X-rays. A low kV cathode operates at 60 kV and a high kV cathode operates at 140 kV, with respect to an anode. The low and high kV cathodes can operate at different voltages to these voltages. Electrons emitted from the cathodes interact with the anode leading to the generation of X-rays which are used within a computed tomography (CT) system. The X-rays generated can be used in other X-ray imaging domains. A power supply (not shown in FIGS. 4-5) provides the voltage levels and controls the cathode currents. The shoot-through cathode shown in FIG. 5 is very compact, saves space and only requires one focusing and deflection unit and provides cost savings over separate dual cathodes.

The X-rays generated from the anode due to electrons emitted from the low kV cathode have a characteristic spectrum and the X-rays generated from the anode due to electrons emitted from the high kV cathode have a characteristic spectrum. The spectral shape depends on the voltage, with the amount of X-rays generated depending on the voltage and the current. The ratio of these X-rays, from the low kV source and the high kV source, is controlled to shape the source spectrum of the X-ray beam to flexibly produce a mixture of high and low energy photons (X-rays), with the spectral shape optimized for a particular patient or for a particular spectral study. In other words, the basic source spectra given for X-ray detection are basically determined by the tube voltage, the target material and the filtration between the beam and the patient. Here, the spectra are optimized for a source-patient-detector system, by shaping the source spectrum of the X-ray beam through control of the source voltages and/or source currents.

In essence, the apparatus, system and method for spectral shaping can operate in two modes that can operate alone or together (in combination):

1. Introducing a linear combination of different voltage sources such that the spectrum is tailored and optimized to the patient, contrast agents, detectors and the spectral study being performed. In other words, different DC voltage sources can have appropriate DC currents provided such that the mixture of high and low energy photons is controlled as required. See FIGS. 4-5.
2. Applying a high-voltage ripple to the source voltage. The source can be shaped by modulating the waveform in such a way that the line integrals used to reconstruct a voxel in the image will have a combination of source voltage energies. This keeps high energy photons while adding more low energy photons. In other words, alternating between the high and low voltages with the duty cycle to control the mixture of high and low energy photons. There are in effect 3 controls, the 2 DC voltage levels and control of the grid (or grids) to cut off (or control) the current from one or the other source. See FIGS. 6-7. However, grids are not necessary because the power source can be configured such that the voltage levels change rapidly. In effect the whole power supply is able to rise in value very quickly and decrease in value quickly, through an internal "crowbar" and/or appropriate circuitry.

In this way, the apparatus, system and method presented here provide a flexible way of producing a mixture of high and low energy photons. The spectral shape can be optimized for a particular patient or for a particular spectral study.

It is to be noted that for spectral CT, the optimal requirement is not necessarily the matching of noise between the low and high energy images. Optimization depends on different dual-energy processing tasks, such as generating iodine maps, creating linearly mixed images, or synthesizing monochromatic images, and the weighting factors for low-energy and high-energy data do not have to be the same. The apparatus, system and method for generating X-rays enables levels of optimization for the task:

The spectrum can be optimized when used in a spectral detection system. The spectrum can be tailored for the type of study being done (i.e. Iodine Maps, Monochromatic images etc.)

Utilization in conventional CT is provided, where high soft-tissue contrast is needed. It is usually advisable to go to the lowest tube voltage possible while maintaining an acceptable noise level. This is usually limited by the tube power or maximum tube current. So if it is necessary to perform at a higher kV than desired to minimize noise, then lower kV can be added by the linear combination of these voltages.

Figure 8:
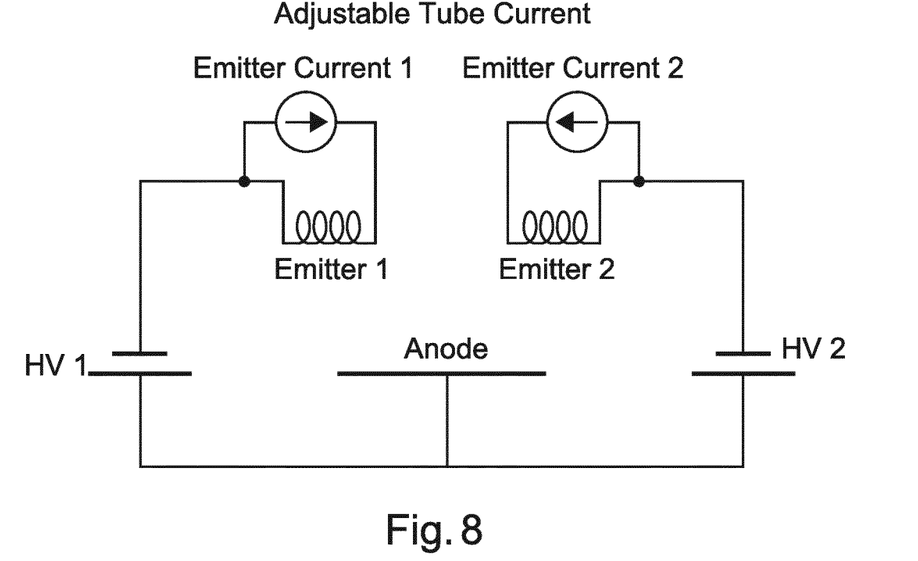
FIG. 8 shows schematic circuit diagram for an adjustable current control.

FIG. 8 shows a circuit for adjustable tube current control, for a unipolar X-ray tube (source). A similar circuit can be used for a bipolar X-ray tube (source). This circuit can be used for the linear combination of photon spectra, and/or the high-voltage modulation as discussed above. Each filament or emitter temperature can be adjusted independently, enabling the mixture of X-rays emitted from each cathode to be controlled or chosen as required. This enables spectral shaping to be optimized for dose or contrast resolution, for example.

Figure 9:
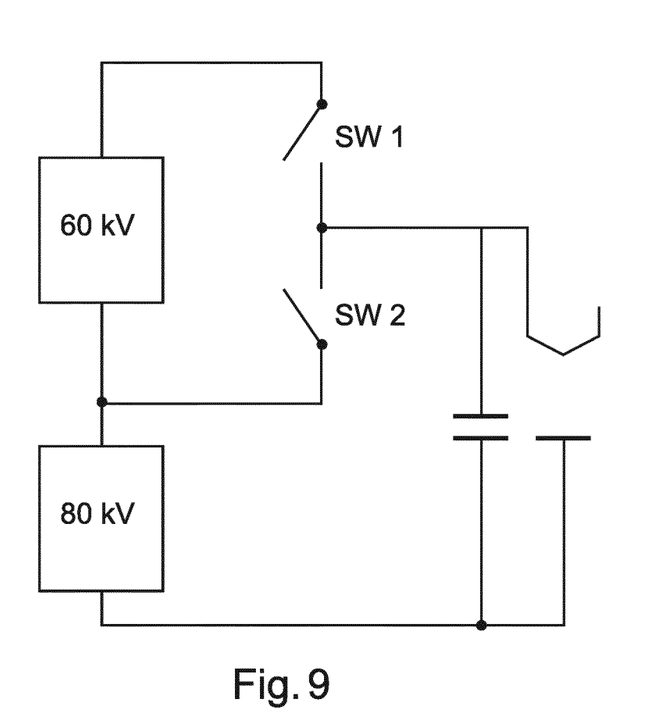
FIG. 9 shows a schematic circuit diagram for voltage ripple modulation control.
Figure 10:
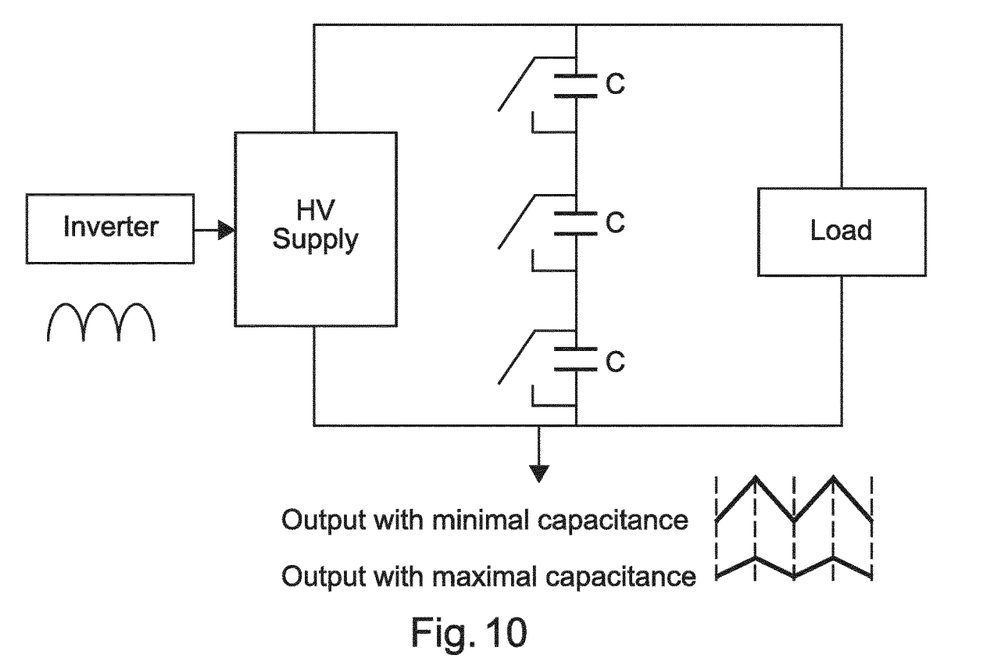
FIG. 10 shows a schematic circuit diagram for voltage ripple modulation control.
Figure 14:
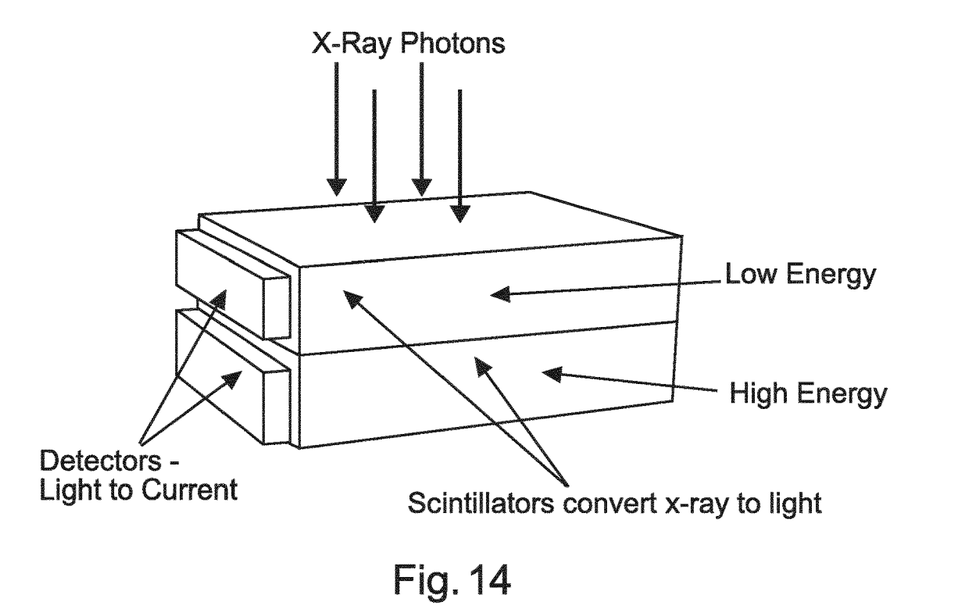
FIG. 14 shows an example of a dual energy detector.
Figure 15:
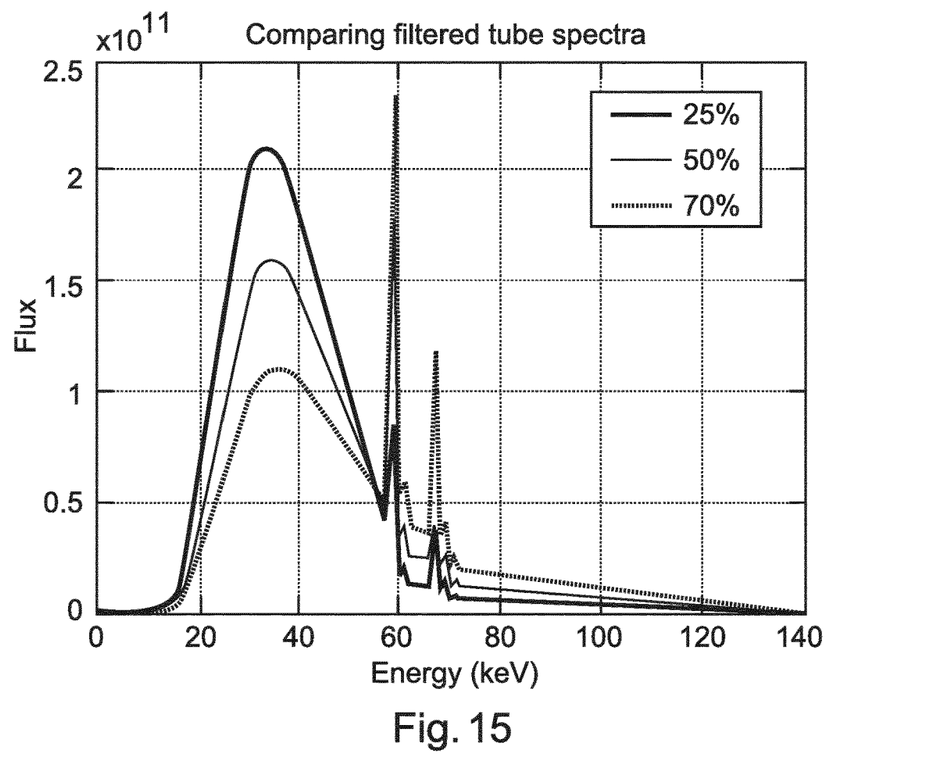
FIG. 15 shows an example of total spectra for an X-ray source operating with different percentages of 60 kV.

More detail on the two techniques (1, 2) discussed above is now provided:

1. Source Spectrum Shaping—Linear combination photon spectra
   a. With 2 or more adjacent cathode structures (as shown in FIG. 4) biased at different voltages.
   b. With a shoot-through cathode structure (as shown in FIG. 5) with 2 or more cathodes biased at different voltages.
2. Source Spectrum—Shaping High voltage modulation
   a. Controlled voltage ripple modulation. The duty cycle shown in FIG. 7 can be generated and controlled by the circuitry shown in FIG. 9 along with the details provided in the table below.
   b. Natural ripple from power supplies with reduced capacitance. Appropriate circuitry is shown in FIG. 10. To explain further: A power supply for CT scanners typically has tight ripple specifications. It is usually thought that the ideal case is one where the voltage is a perfect DC. HV ripple will often be a function of the tube current. If the ripple changed too much with the power required then the measured CT numbers may not be consistent. However, if spectral images are being acquired, where images are being generated from different photon energy ranges, then this can be viewed a little differently. In the present situation the ripple is used advantageously to get the optimal amount of photons in the energy ranges of interest. This can be achieved by choosing generator capacitances much smaller than typically used. Or it can be achieved in a more flexible method of selecting the capacitance based on the study being preformed.
   c. The high-voltage waveforms do not need to be synchronized with sampling where a pure spectrum shaping effect is desired, because a spectral discriminating detector can be used. To explain further: One method to scan a patient is to scan at one kV and then go back and scan the same region of interest at another kV. The goal is to reconstruct a given voxel in global space with 2 different energies. However, the patient can move and when small structures are trying to be analyzed, good image registration (between the two images) may not be possible. Another way to do this is use 2 separate X-ray sources operating at 2 separate voltages, with the sources spread out by a distance. This has the same problem with the solution above, in that image registration may not be achievable. A third implementation is to alternate the source between 2 separate voltages that are synchronized with the data sampling periods. The odd sampling periods are reconstructed into the first energy reconstructions and the even sampling periods into the second energy reconstruction. To do this well you need very fast kV rise and fall times, and this can be difficult to achieve. Therefore, special detectors can be used to measure different photon energy groups (such a detector is shown in FIG. 14). This enables photon energies to be discriminated. Two readings, corresponding to different photon energies, can be obtained at the same place and time. Now each voxel in an image is built from many different samples. So the effective data taken would be (sort of) an average of the different kV from the varying source. A spectral discriminating measurement is used to separate the photon energies. Therefore, synchronization with sampling is not required. Rather than use a dual energy detector, photon counting using more than two energy bins can be used.

d. The high-voltage waveforms can be synchronized with the anode frequency for special functions:
  i. Minimize the effects of anode slots or other anode imperfections
  ii. To make a system where different filtration is built into the anode. Different voltages can be synched to different filtrations incorporated into the rotating anode target.
  iii. To explain further: Controlled modulation can be used with an anode with different materials. For example, to provide the higher voltage on one type of material and the low voltage on another type of material. You can therefore further enhance the degrees of freedom for shaping the source spectrum: two different kVs can be set; the duty cycle can be set; and the materials that the high and low voltage electrons hit can be set.

e. The high-voltage waveforms can be synchronized to a grid or data sampling periods, where synchronization to the grid enables shaping of the photon energy distribution. To explain further: If it is desired to make a dual energy image of an object with a dual energy detector, and the voltage is set at 120 kV, what happens is that most of the photons getting through the object are at or close to the high energy range of 120 kV, and very little low energy photons are detected. Consequently, little information in the low energy range is available. Therefore, the source photons at the higher ranges are "turned down" by lowering the current for the 120 kV source, and a second source is added at 80 kV to add more lower energy photons, with a grid being used to control the relative amounts of the photons from these sources. Now you can adjust parameters, in the manner described here, to get more optimal information in both the higher and lower energy ranges.

| Switch 1 | Switch 2 | Output |
|---|---|---|
| Closed | Open | 140 kV |
| Open | Closed | 80 kV |

Switching parameters associated with the circuit shown in FIG. 9, with switches provided as a series of semiconductor devices or vacuum switches, for example.

Figure 11:
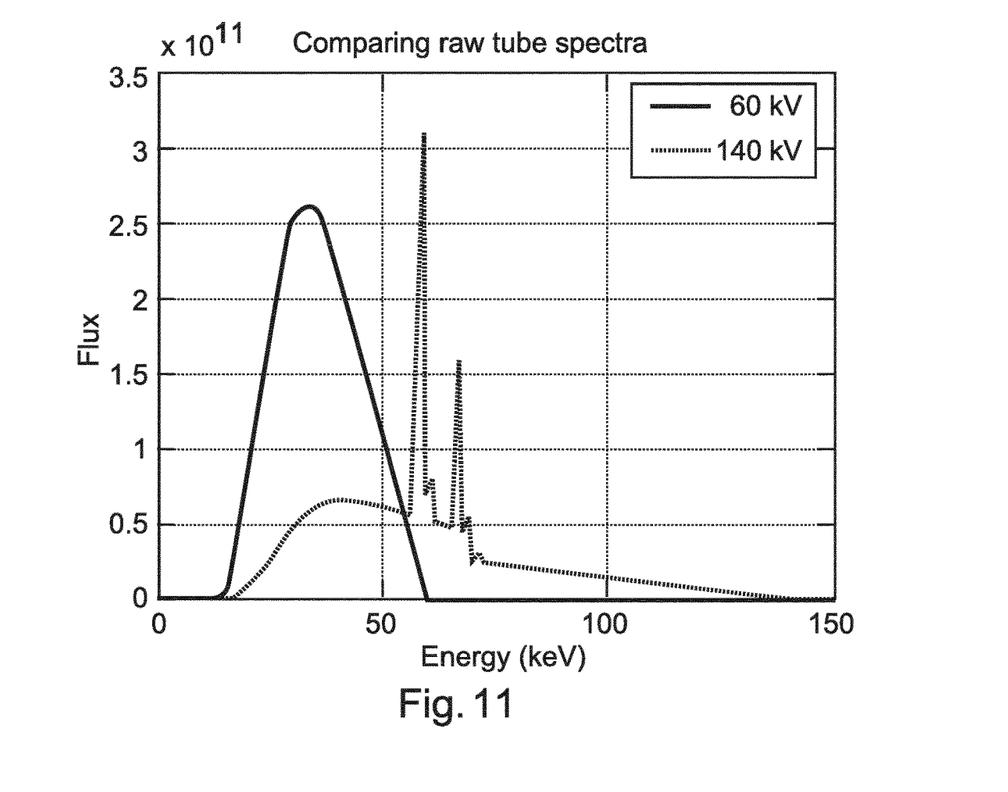
FIG. 11 shows normalized photon energies for a 60 kV source and a 140 kV source.
Figure 12:
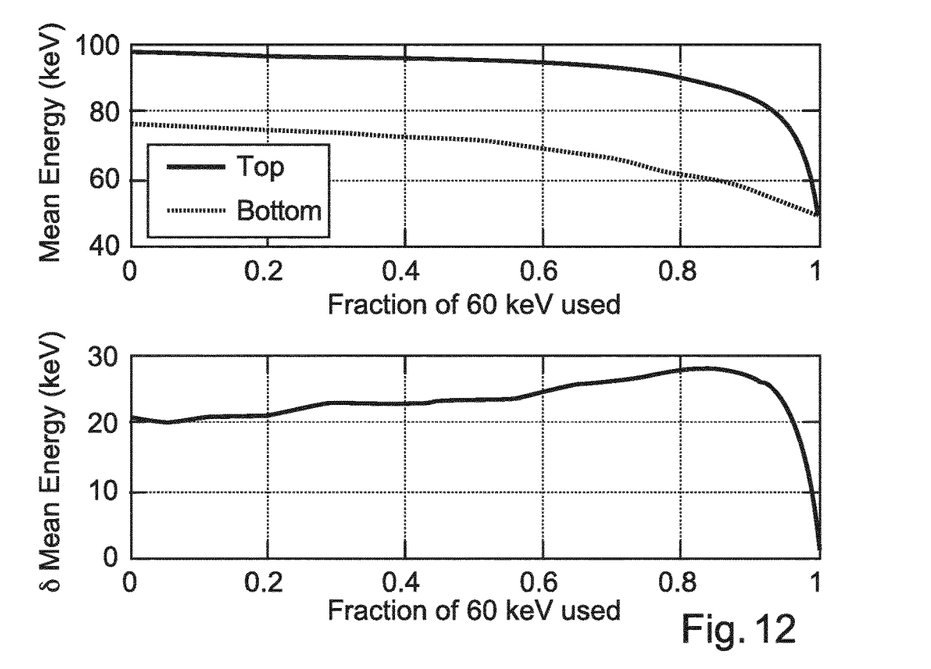
FIG. 12 shows an example of optimization curves for maximum KV separation.
Figure 13:
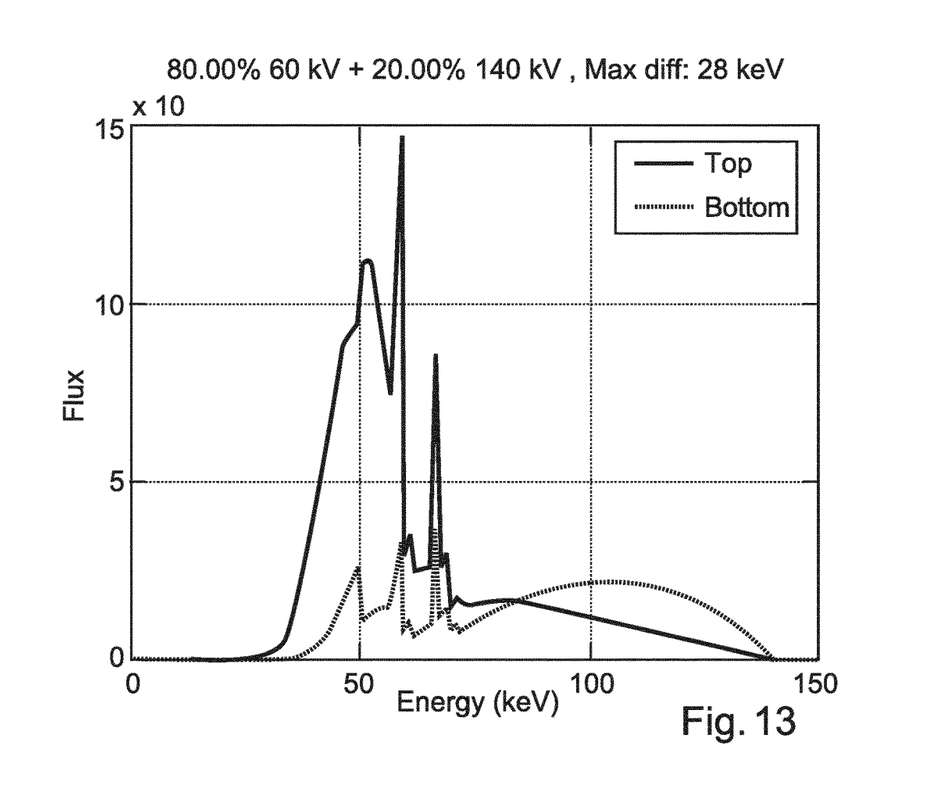
FIG. 13 shows an example of optimized spectrum absorption.

One simple optimization is to obtain a maximum average kV separation for the dual energy detector shown in FIG. 14. The tube currents for the cathode shown in FIG. 5 are adjusted in order that the 60 kV source and the 140 kV source provide the same integrated X-ray energies—this is shown in FIG. 11. As discussed above, the circuit shown in FIG. 8 enables the filament and emitter temperatures to be controlled in order that the integrated energies associated with each cathode are the same other ratios of energies and integrated energies is possible other than a 1:1 ratio. As shown in FIGS. 12-13 a maximum kV separation with the particular dual layer detector of FIG. 14 and 40 cm of water can be 28 KeV. Without the kV shaping, using the present apparatus, the maximum separation would be 20 KeV. Therefore, the present apparatus, system and method for generating X-rays for this particular example demonstrates a 40% increase in spectral performance. This optimum is achieved at 80% of the 60 kV and 20% of the 140 kV of the normalized curves. An example of different linear combinations of 60 kV and 140 kV can be seen in FIG. 15.

Figure 7:
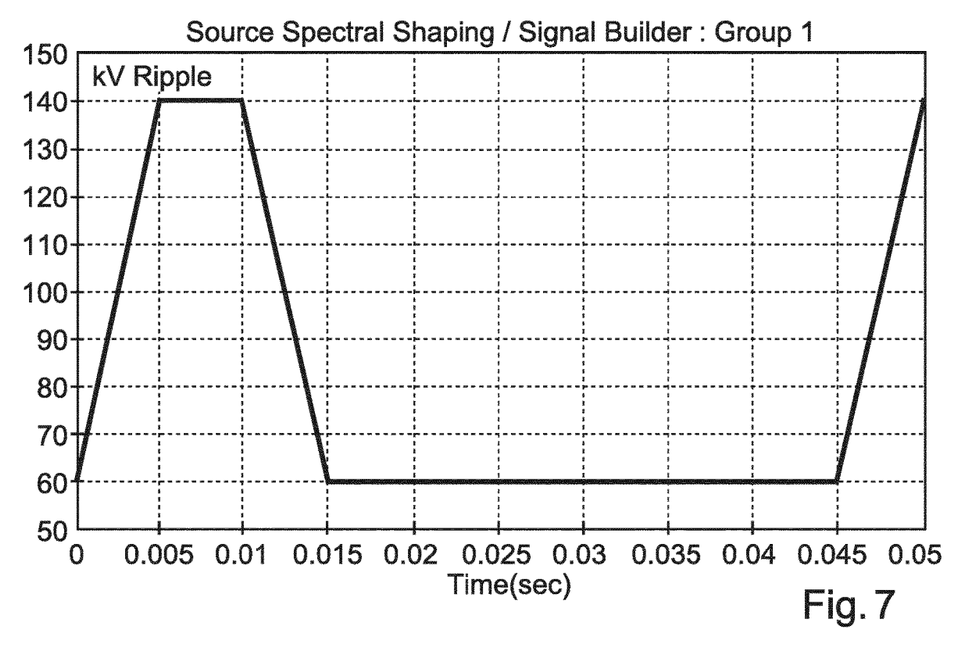
FIG. 7 shows a high voltage ripple, with duty cycle control.
Figure 16:
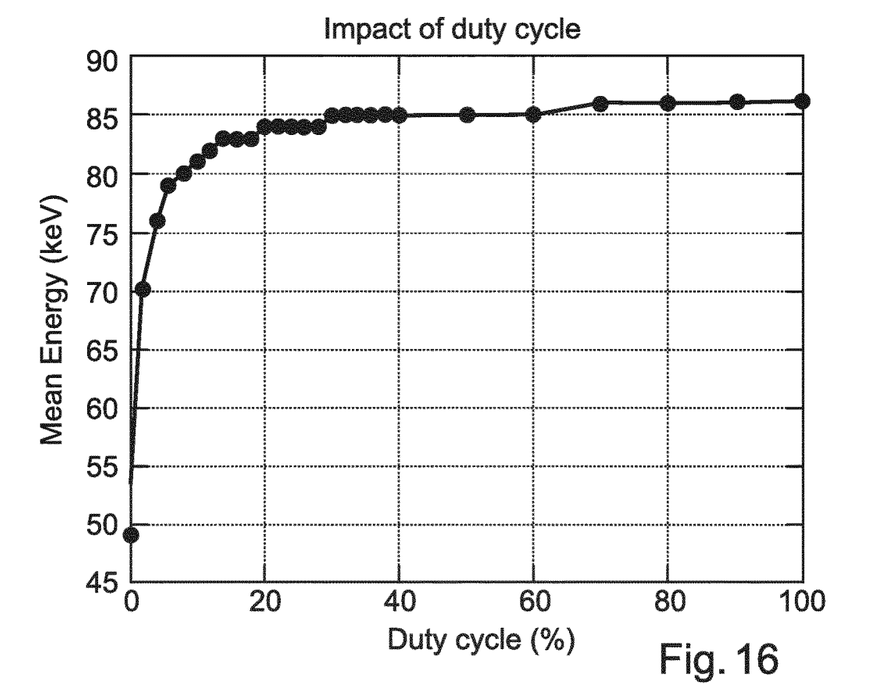
FIG. 16 shows an example of average energy as a function of duty cycle.
Figure 17:
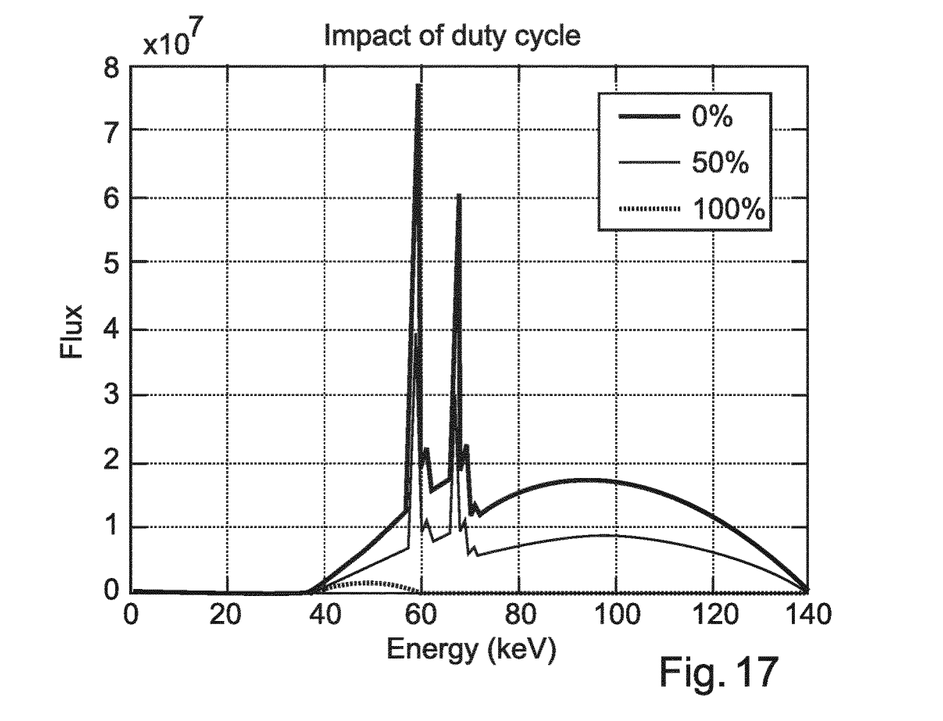
FIG. 17 shows an example of spectra after 40 cm Water for different duty cycles.

Regarding the implementation of a high voltage ripple configuration, a controlled modulated duty cycle approach can be utilized, as shown in FIG. 7. Without a grid being used to control the tube current independently, a lot of time has to be spent in the low energy to have a significant impact on the spectrum. The average energy as a function of duty cycle is shown in FIG. 16. The spectrum after going through 40 cm of water is shown in FIG. 17. This can be improved greatly if a grid is added to the configuration, enabling the X-ray fluence to be balanced.

Summary of Configurations for Source Shaping, which can be utilized alone or in combination:
1. Independent Voltage sources with independent emission controls providing a single source spectrum
2. High-Voltage Ripple—Naturally occurring as arranged by the supply and capacitance of the system
3. High-Voltage Ripple Modulated—Controlled via the control loop of the system
4. High-Voltage Ripple Modulated with a Grid Control— The spectra can be better balanced so kV control will be easier to modulate in a controllable range In another exemplary embodiment, a computer program or computer program element is provided that is characterized by being configured to execute the method steps of the method according to one of the preceding embodiments, on an appropriate system.

The computer program element might therefore be stored on a computer unit, which might also be part of an embodiment. This computing unit may be configured to perform or induce performing of the steps of the method described above. Moreover, it may be configured to operate the components of the above described apparatus and/or system. The computing unit can be configured to operate automatically and/or to execute the orders of a user. A computer program may be loaded into a working memory of a data processor. The data processor may thus be equipped to carry out the method according to one of the preceding embodiments.

This exemplary embodiment of the invention covers both, a computer program that right from the beginning uses the invention and computer program that by means of an update turns an existing program into a program that uses invention.

Further on, the computer program element might be able to provide all necessary steps to fulfill the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section.

A computer program may be stored and/or distributed on a suitable medium, such as an optical storage medium or a solid state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. An apparatus for generating X-rays, comprising:
a first cathode and a second cathode;
an anode;
a power supply configured to produce:
 a first voltage between the first cathode and the anode, and
 a second voltage between the second cathode and the anode, wherein first X-rays are generated in response to the first voltage, wherein second X-rays are generated in response to the second voltage, and wherein the power supply is configured to switch between the first voltage and the second voltage at the first cathode and/or at the second cathode; and
a processor configured to control the power supply in order to control a ratio between the first X-rays and the second X-rays.

2. The apparatus according to claim 1, wherein the power supply is configured to supply a first current to the first cathode and a sec and current to the second cathode, and wherein the processor is configured to control the first current and the second current such that the ratio between the first X-rays and the second X-rays is controlled.

3. The apparatus according to claim 1, further configured to determine an energy of the first X-rays and the second X-rays, wherein the ratio between the first X-rays and second X-rays comprises another ratio between the energy of the first X-rays and the energy of the second X-rays.

4. The apparatus according to claim 3, wherein the energy of the first X-rays comprises an integrated X-ray energy, and the energy of the second X-rays comprises an integrated X-ray energy.

5. The apparatus according to claim 1, wherein the power supply is configured to switch between the first voltage and the second voltage using a duty cycle, and wherein the processor is configured to control the duty cycle to control the ratio between the first X-rays and the second X-rays.

6. The apparatus according to claim 1, wherein the first cathode and the second cathode comprise at least one grid switched cathode head.

7. The apparatus according to claim 6, wherein the at least one grid switched cathode head is synchronized with the duty cycle.

8. The apparatus according to claim 1, wherein the power supply is configured such that the anode is operable to generate the first X-rays and the second X-rays substantially concurrently.

9. The apparatus according to claim 1, wherein the anode comprises a rotating body, and the power supply is configured to be synchronized with a rotational frequency of the anode.

10. A system for imaging an object, comprising:
an apparatus for generating X-rays, comprising:
 a first cathode and a second cathode;
 an anode;
 a power supply configured to produce:
  a first voltage between the first cathode and the anode, and
  a second voltage between the second cathode and the anode, wherein first X-rays are generated in response to the first voltage, wherein second X-rays are generated in response to the second voltage, and wherein the power supply is configured to switch between the first voltage and the second voltage at the first cathode and/or at the second cathode; and
 a processor configured to control the power supply in order to control a ratio between the first X-rays and the second X-rays
an X-ray detector configured to acquire image data of an object; and
an output configured to output data representative of the image data of the object.

11. A method for generating X-rays, comprising:
providing a first cathode and a second cathode;
providing an anode;
producing a first voltage between the first cathode and the anode using a power supply;
producing a second voltage between the second cathode and the anode using the power supply, wherein first X-rays are generated in response to the first voltage, wherein second X-rays are generated in response to the second voltage;

switching between the first voltage and the second voltage at the first cathode and/or at the second cathode; and controlling the power supply in order to control a ratio between the first X-rays and the second X-rays.

12. A non-transitory computer readable medium having one or more executable instructions stored thereon, which when executed by a processor, cause the processor to perform a method for generating X-rays, comprising:

providing a first cathode and a second cathode;

providing an anode;

producing a first voltage between the first cathode and the anode using a power supply;

producing a second voltage between the second cathode and the anode using the power supply, wherein first X-rays are generated in response to the first voltage, wherein second X-rays are generated in response to the second voltage;

switching between the first voltage and the second voltage at the first cathode and/or at the second cathode; and controlling the power supply in order to control a ratio between the first X-rays and the second X-rays.

\* \* \* \* \*